US012428868B2

(12) United States Patent
Lee et al.

(10) Patent No.: US 12,428,868 B2
(45) Date of Patent: Sep. 30, 2025

(54) HARD ROOFTOP TENT

(71) Applicants: Yoo Kyeong Lee, Suwon-si (KR);
Kang Wook Lee, Yongin-si (KR)

(72) Inventors: Yoo Kyeong Lee, Suwon-si (KR);
Kang Wook Lee, Yongin-si (KR)

( * ) Notice: Subject to any disclaimer, the term of this patent is extended or adjusted under 35 U.S.C. 154(b) by 259 days.

(21) Appl. No.: 18/274,543

(22) PCT Filed: Jan. 28, 2022

(86) PCT No.: PCT/KR2022/001544
§ 371 (c)(1),
(2) Date: Jul. 27, 2023

(87) PCT Pub. No.: WO2022/173158
PCT Pub. Date: Aug. 18, 2022

(65) Prior Publication Data
US 2024/0084617 A1    Mar. 14, 2024

(30) Foreign Application Priority Data

Feb. 9, 2021   (KR) .......................... 10-2021-0018599

(51) Int. Cl.
*E04H 15/06*    (2006.01)
*B60P 3/39*     (2006.01)
*E04H 15/00*    (2006.01)

(52) U.S. Cl.
CPC ................ *E04H 15/06* (2013.01); *B60P 3/39* (2013.01); *E04H 15/008* (2013.01)

(58) Field of Classification Search
CPC ........... E04H 15/008; E04H 15/06; B60P 3/39
See application file for complete search history.

(56) References Cited

U.S. PATENT DOCUMENTS 2,643,788 A * 6/1953 Burrows .................. B65D 7/24
220/4.28
2,710,977 A * 6/1955 Fannin ...................... B60P 3/38
135/96

(Continued)

FOREIGN PATENT DOCUMENTS

| JP | 3191156 U | 6/2014 |
| KR | 10-1745250 B1 | 6/2017 |

(Continued)

*Primary Examiner* — Noah Chandler Hawk
(74) *Attorney, Agent, or Firm* — KORUS Patent, LLC; Seong Il Jeong

(57) ABSTRACT

The present invention relates to a hard rooftop tent mounted and used on the roof of a vehicle or trailer. To this end, according to the present invention, automatic erection is performed by erection means installed directly on first and second partition walls constituting front and rear upright skeleton walls among the front and rear upright skeleton walls and both side walls formed as one unit between a lower case and an upper case to form and eliminate an inner activity space through the unlocking operation of locking means. Accordingly, the erection structure of the front and rear upright skeleton walls is considerably simplified. Furthermore, the front and rear upright skeleton walls and the side walls can be securely accommodated and stored inside the lower and upper cases made of hard materials. Furthermore, the moisture water generated due to dew condensation can be easily removed through a trench.

15 Claims, 15 Drawing Sheets

(56) References Cited

U.S. PATENT DOCUMENTS

| | | | | | |
|---|---|---|---|---|---|
| 2,811,725 | A | * | 11/1957 | Cence | ........................ B60P 3/38 |
| | | | | | 135/117 |
| 3,351,078 | A | * | 11/1967 | Kleiman | ................... B60P 3/38 |
| | | | | | 135/153 |
| 3,796,342 | A | * | 3/1974 | Sanders | ............. B65D 11/1826 |
| | | | | | 220/6 |
| 4,050,732 | A | * | 9/1977 | MacIsaac | ................ B60P 3/341 |
| | | | | | 296/159 |
| 4,366,979 | A | * | 1/1983 | Pillot | ........................ B60P 3/38 |
| | | | | | 296/160 |
| 9,222,278 | B2 | * | 12/2015 | Park | ........................ E04H 15/06 |
| 11,352,777 | B2 | * | 6/2022 | Chinn | ................... E04B 1/3445 |
| 2017/0335561 | A1 | * | 11/2017 | Wickramasekera | .... H02S 20/23 |

FOREIGN PATENT DOCUMENTS

| KR | 10-1810332 B1 | 12/2017 |
|---|---|---|
| KR | 10-2018-0077915 A | 7/2018 |
| KR | 10-2029340 B1 | 10/2019 |

\* cited by examiner

HARD ROOFTOP TENT

TECHNICAL FIELD

The present invention relates generally to a hard rooftop tent mounted and used on the roof of a vehicle or trailer, and more particularly, to a hard rooftop tent in which durability is remarkably improved because the overall tent is made of hard materials, the operations of forming and closing the inner activity space of the tent are significantly facilitated by a folding means installed directly on a folding panel itself, and moisture flowing down inner walls due to the temperature difference can be separated and removed through the configuration of a trench provided around the bottom of a lower case, so that a mattress, etc. can always be securely and hygienically managed, stored, and used without the problem of getting wet.

BACKGROUND ART

Recently, various leisure activities are known through the media. As interest in leisure activities increases, leisure activities are becoming established as a culture. In addition to these leisure activities, various leisure products are being actively developed. Among them, rooftop tents, also called car pensions, which are mounted on the roofs of vehicles or trailers so that they can be used like mobile houses, are gaining much popularity, and the demand for them is also on the rise.

Rooftop tents are a combination of leisure and automobile culture, and are used in a state of being mounted on the roofs of vehicles or trailers. Compared to tents in the form of tents that are installed and used on the ground in the past, rooftop tents have advantages in that it is possible to easily move and install them without being affected by obstacles or installation locations and it is considerably easy to carry, store and handle them without requiring separate storage places. In addition, the purchase cost is relatively low compared to campers used for camping, so that rooftop tents are widely used in line with an increase in campers.

Some examples of the rooftop tents that have been provided conventionally are as follows:

Patent document 1 proposes a "vehicle roof-mounted tent," including: a tent case including a base detachably mounted on the roof of a vehicle and a cover hingedly connected to the base to be selectively opened and closed; a locking means configured to lock the cover to the base; a cover opening means configured to rotate the cover to be opened when the action of the locking means is released; a tent cloth configured to be accommodated in the tent case with an end thereof attached to an edge exclusive of a connection portion between the base and the cover, and also configured to, when the cover is opened, be deployed and form a camping space, blocked from the outside, between the base and the cover; an entrance provided on both sides or one side of the tent cloth; a fly cloth configured to be accommodated in the tent case with the top thereof attached to the cover in front of the entrance, and also configured to, when deployed, form a movement space blocked from the outside by covering a space between the entrance and the door of the vehicle; and a pusher configured to push the fly cloth outward when the cover is opened; wherein camping is freely performed in a state in which there is no gaze or interference from others due to the movement space and the camping is not affected by the external climate.

In addition, patent document 2 proposes a "Space Expansion-type Hard Cell Rooftop Tent for a Vehicle," including a lower case configured to be detachably fixed to the roof of a vehicle and an upper case configured to selectively close and open the lower case through an opening/closing means, the space expansion-type hard cell rooftop tent further including: an extension plate slidably connected to the lower case; a support pole having both ends pivotally connected to both sides of the rear of the expansion plate, respectively; and a tent cloth connected to at least the upper case, the support pole, and the extension plate; wherein the extension plate is slidable between a first position located to overlap the lower case and a second position maximally drawn out from the lower case; and wherein the support pole is located adjacent to the expansion plate when the expansion plate is located in the first position, and is lifted upward by the tent cloth when the expansion plate is located in the second position.

However, although conventionally provided rooftop tents have several advantages over tents that are made of only tent materials and are installed and used on the ground, rooftop tents, in which the material of the part that is unfolded to form the inner activity space of the tent is made of a tent cloth, have considerable problems with durability due to various problems such as weather or climatic conditions, and fear of damage or breakage due to repeated use of folding. In addition, tents made of tent materials are problematic in that even when waterproof fabric is used, it is difficult to rule out the possibility of rainwater permeating into the interior in case of rain due to the deterioration of waterproof function attributable to various factors or the like. Furthermore, these tents are also problematic in that when moisture is generated in an inner active space due to the temperature difference between the inside and outside of the tent in the winter season or the like, it is considerably difficult to appropriately remove the moisture. In particular, when such moisture is condensed and flows down to the floor of the tent, it inevitably leads to a problem of wetting various bedding or articles including a mattress laid on the floor of the tent.

Therefore, in the case of the rooftop tent structure using a tent as described above, when the tent is inevitably wet or various bedding including mattresses are wet, there are considerable inconvenience and hassle in which it is necessary to dry them for hygienic use. Furthermore, it may be considered that there are considerable difficulties in sanitary management, such as requiring a separate time, place, and effort for drying.

In addition, among the rooftop tents that have been provided in the past, some tents in each of which an overall material constituting a tent is made of a hard material are provided. However, the folding structure of the four-sided panels that are folded and unfolded to form an inner space is considerably complex and cumbersome. Furthermore, even in the case of the above-described rooftop tents, there is no separate means for removing internal moisture caused by the temperature difference. Accordingly, the rooftop tent has structural limitations in that it is difficult to avoid problems in which a floor gets wet due to moisture flowing down an inner wall and bedding or various items including a mattress on the floor get wet due to the moisture.

DISCLOSURE

Technical Problem

The present invention has been conceived to overcome the above-described conventional problems, and an object of the present invention is to provide a hard rooftop tent in which durability is remarkably improved because a material for forming an inner activity space is fabricated using a hard material such as an aluminum composite panel rather than a tent material, the operations of forming and closing the inner activity space of the tent are performed considerably simply by erection means installed directly on front and rear upright skeleton walls themselves, and a mattresses, etc., which are laid on the bottom layer of a floor and used, are always securely and hygienically managed, stored, and used without the problem of getting wet because water or moisture flowing down inner walls due to dew condensation is separated and removed through the configuration of a trench provided around the bottom of a lower case.

Technical Solution

In order to accomplish the above object, the present invention provides a hard rooftop tent, including: a lower case made of a hard material, and configured to be detachably fixed and supported on a roof of a vehicle or trailer; an upper case made of a hard material, and configured to be selectively locked and unlocked to and from the lower case by a locking means; and front and rear upright skeleton walls and both side walls interposed between the lower and upper cases, connected and supported to and on the lower and upper cases as one unit in order to form and eliminate an inner activity space through an operation of folding into the inside thereof or unfolding, and made of a hard material; wherein the lower case includes outer walls, inner walls, and a bottom layer; wherein the upper case includes outer walls, inner walls, and a ceiling; wherein the front and rear upright skeletal walls include first and second partition walls hinged to the outer walls of the lower case and the inner walls of the upper case so that both ends are folded to an inside of the lower case and configured such that partition boundary surfaces are also connected and supported by hinges, erection operation spaces formed between the partition boundary surfaces of the first and second partition walls to allow the first and second partition walls to be erected on their own, and an erecting means connected to the first and second partition walls in order to be rotated and folded through the erection operation space; wherein the side walls include an entrance, are disposed on both sides of the front and rear upright skeletal walls, and are sequentially folded with lower ends hinged to the outer walls of the lower case; and wherein a trench configured to collect and remove water or moisture flowing along inner walls of the tent is formed between the outer and inner walls of the lower case.

According to the present invention, a drainage hole is further formed in the trench.

According to the present invention, the lower case, the upper case, the bottom layer, the front and rear upright skeletal walls, the side walls, and the ceiling are each made of any one of aluminum, and an aluminum composite panel having a three-layer structure including profiles, compressed insulation foams, and aluminum plates.

According to the present invention, the ceiling of the upper case is formed by sequentially stacking a first ceiling support layer made of an insulating foam mat and a second ceiling support layer made of an aluminum composite panel.

According to the present invention, erection support walls configured to stably erect and support both the side walls are further extended from the first and second partition walls of the front and rear upright skeleton walls.

According to the present invention, the side walls are configured such that the front and rear upright skeleton walls are first erected by the erection means and then sequentially erected when the inner activity space is formed, and are sequentially folded first when the inner activity space is eliminated.

According to the present invention, the side walls are further provided with erection maintenance means for stably maintaining an erected state with respect to the front and rear upright skeletal walls, and the erection maintenance means each includes a catch ring fixed to the erection support wall extending at right angles from the second partition wall of the front and rear upright skeleton walls, a slide holder fixed to an inner surface of a corresponding one of the side walls, and a movement control pin mounted inside the slide holder to be movable left and right and engaged and released with and from the catch ring.

According to the present invention, the side walls are configured such that a folding operation is performed smoothly and stably by further installing an auxiliary erection means between the side walls and the lower case.

According to the present invention, a shield is further provided on either side or both sides of the entrance that is open in the side walls.

According to the present invention, the erection means are shock absorbers.

According to the present invention, the outer walls of the lower case and the inner walls of the upper case are arranged on same vertical lines so that the front and rear upright skeleton walls and the side walls can be folded between them, and the outer walls of the upper case are formed to extend further below lower ends of the inner walls of the upper case so that when the upper case is closed with respect to the lower case, the upper case is closed in a such a manner that portions of the outer walls of the lower case are surrounded by the upper case.

According to the present invention, each of the shock absorbers is any one of gas, hydraulic, and electric shock absorbers.

According to the present invention, partition covers configured to cover the erection means further cover and are coupled to inner surfaces of the first and second partition walls in which the erection operation spaces are formed.

According to the present invention, a roof fixation part is provided beneath the lower case.

According to the present invention, the roof fixation part includes a support plate, a first fixation element configured to fasten and fix the support plate to the lower case, and a second fixation element configured to fix the support plate to a roof rack.

Advantageous Effects

According to the present invention, durability is significantly increased by fabricating the tent, providing the inner activity space, using the hard material. The folding structure for forming and eliminating the inner activity space of the tent can be made considerably simple through an operation in which the front and rear upright skeleton walls are directly unfolded or folded vertically and simultaneously with the opening of the upper case by the erection means directly built in between the first and second partition walls of the front and rear upright skeleton walls. Furthermore, moisture can be easily separated and removed through the configuration of the trench formed around the edge along the bottom support layer of the lower case even when moisture condenses and flows down the inner walls of the walls due to dew condensation, so that the mattress, etc. are prevented from getting wet due to water or moisture, with the result that the hygienic carrying, management and storage of the tent become considerably easy.

The technical effects of the present invention are not limited to those described above, and other technical effects not described above will be clearly understood by those skilled in the art from the following descriptions.

MODE FOR INVENTION

Figure 1:
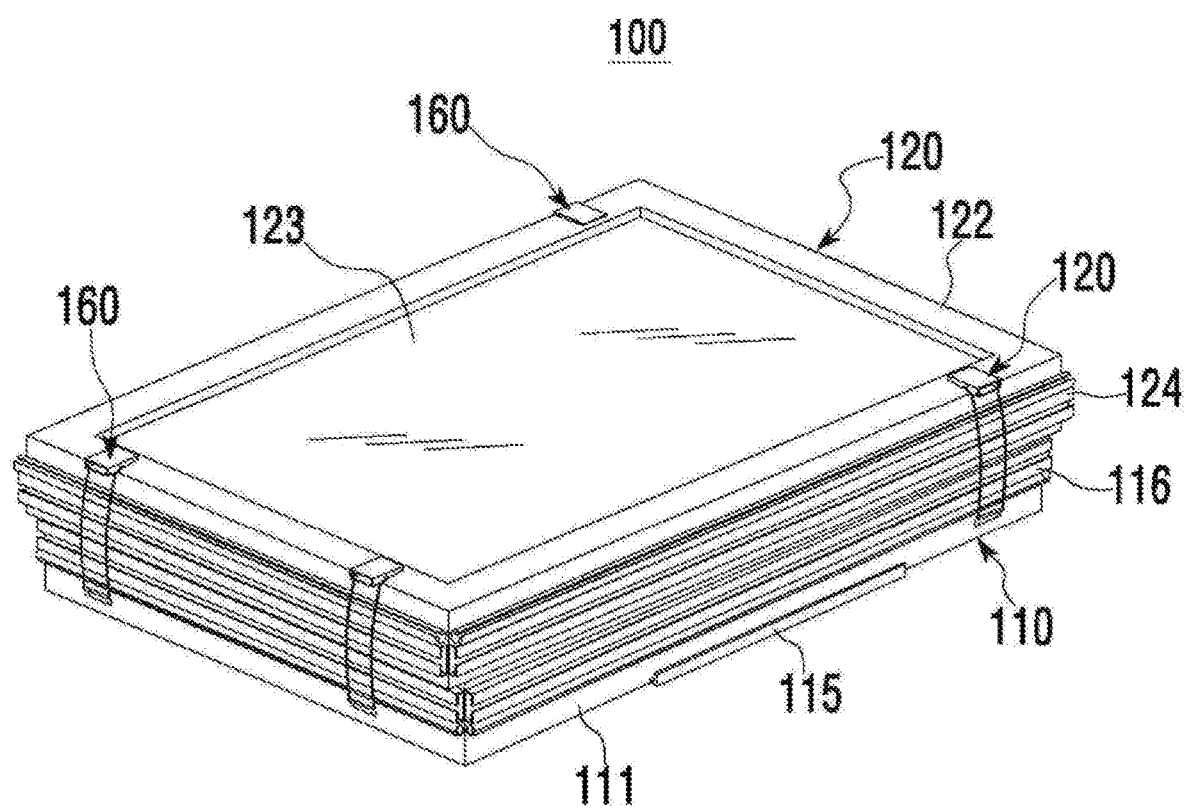
FIG. 1 is a perspective view of the folded state of a hard rooftop tent according to the present invention.

Hereinafter, preferred embodiments according to the present invention will be described in more detail with reference to the accompanying drawings.

Referring to FIGS. 1 to 15, a hard rooftop tent 100 according to the present invention may include a lower case 110, an upper case 120, and front and rear upright skeleton walls 140 and both side walls 150 configured to form an inner activity space 130.

The lower case 110 is configured to be selectively attached and detached to and from the roof of a vehicle or trailer. Furthermore, the lower case 110 may be made of a hard material such as aluminum or an aluminum composite panel, and may have an open top shape. Moreover, the lower case 110 may be fabricated to have a length and width corresponding to the length and width of a roof required to be installed.

Figure 5:
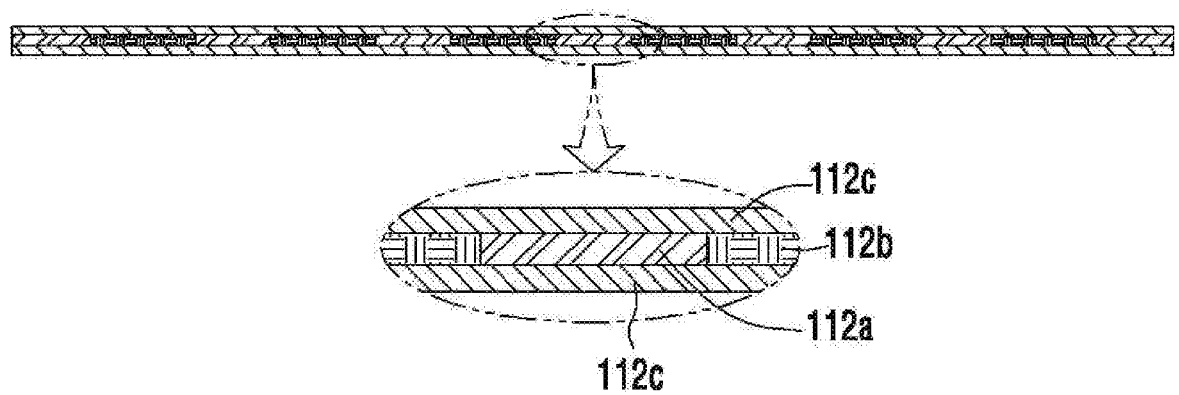
FIG. 5 is an excerpt sectional view showing the structure of the bottom layer of another lower case according to the present invention.
Figure 6:
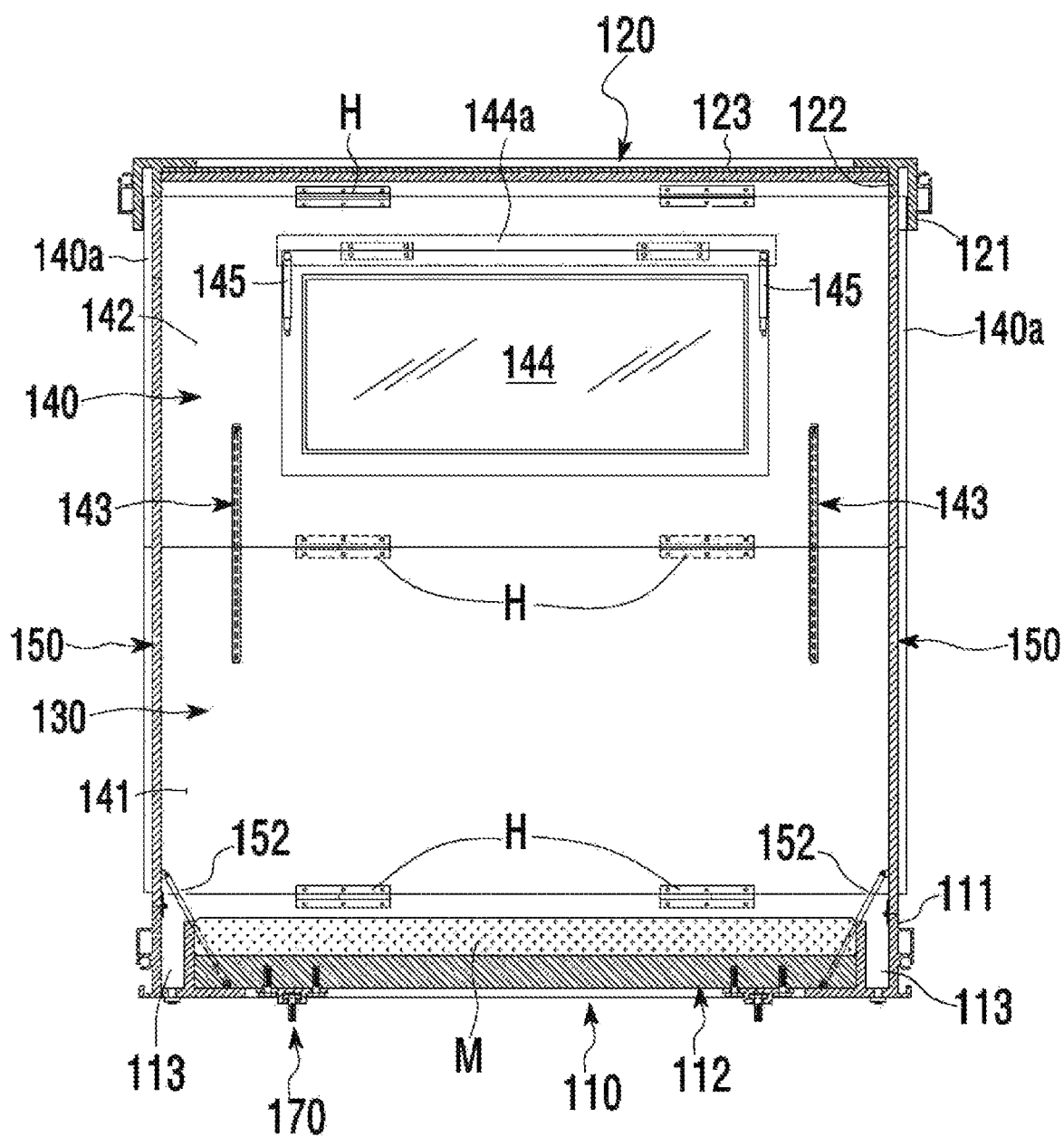
FIG. 6 is a sectional view of a state in which the hard rooftop tent according to the present invention is unfolded based on FIG. 3.

In this case, when the lower case 110 is made of an aluminum composite panel, it may have a three-layer structure composed of profiles 112a serving as supports, compressed insulation foams 112b, and aluminum plates 112c, as shown in FIG. 5 as an example.

The lower case 110 includes outer walls 111, a bottom layer 112 provided to form a floor upon internal activity inside the outer walls, and inner walls 114 installed to stand at a predetermined height to form a trench 113 through the gap between the bottom layer and a frame. In the trench 113, drainage holes 113a configured to drain collected water to the outside may be formed at appropriate positions.

The inner walls 114 configured to form the trench 113 preferably has an appropriate height. For example, it is preferable to prevent water collected in the trench 113 from overflowing over the bottom layer 112 and a mattress M mounted on the bottom layer 112.

In each of the drainage holes 113a of the trench 113, a drain valve 113b may be further installed to desirably drain collected water as needed.

Through the configuration of the trench 113 provided in the lower case 110, it is significantly easy to collect and remove moisture or water generated in the inner activity space by dew condensation when the tent is used.

Except for the bottom layer 112, the lower case 110 made of a hard material is preferably used to have a thickness T within the range of 3 to 5 by taking into consideration the total weight of the tent. The outer walls 111, the trench 113, and the inner walls 114 may be fabricated in an integrated form.

The bottom layer 112 is intended to form an inner floor when the tent is put up and used. The bottom layer 112 is preferably composed of a single layer made of a hard material. However, it may be composed of a plurality of layers by taking into consideration various conditions such as the strength or insulation of the bottom layer.

The bottom layer 112 is preferably formed of an aluminum composite panel.

A three-layer structure composed of profiles 112a arranged at appropriate intervals and serving as supports, compressed insulation foams 112b interposed between the profiles, and aluminum plates 112c provided on both sides of the profiles and the compressed insulation foams in an integrated manner, as shown in FIG. 5, may be used as the aluminum composite panel constituting the bottom layer 112.

The mattress M configured to provide cushioning force to the floor may be placed and used on the bottom layer 112.

Meanwhile, a ladder support 115 configured to support the upper part of a ladder 180 inclined between itself and the ground when the tent is put up may be further provided on the outer circumferential surface of the lower case 110. In this case, various types of ladders may be appropriately used, and various structures including a folding structure may be used.

The upper case 120 is configured to selectively close and open the open end of the lower case 110. The upper case functions as the ceiling of the tent, has an open bottom shape to correspond to the lower case, and may be made of a hard material such as aluminum or an aluminum composite panel like the lower case 110.

In this case, when the upper case 120 is made of an aluminum composite panel, it may have a three-layer structure composed of profiles 112a serving as supports, compressed insulation foams 112b, and aluminum plates 112c, as shown in FIG. 5 as an example.

The upper case 120 includes outer walls 121 and inner walls 122, and also includes a ceiling portion 123.

The outer walls 121 of the upper case 120 are formed to extend downward below the inner walls 122 formed inside the outer walls 121. When the lower case 110 is covered with the upper case 120, the upper ends of the outer walls of the lower case 110 are covered with the lower ends of the outer walls 121 of the upper case 120 with parts of the upper ends of the outer walls 111 of the lower case surrounded with the lower ends of the outer walls 121. The inner walls 122 of the upper case 120 are formed to be disposed on the same vertical lines as the outer walls 111 of the lower case 110.

The inner activity space 130 of the tent is substantially formed inside the outer walls 111 of the lower case 110 and the inner walls 122 of the upper case 120 when the fact that the front and rear upright skeleton walls 140 and both the side walls 150, which will be described later, are configured to be folded.

The upper case 120 made of a hard material is preferably used and fabricated to have a thickness T within the range of 3 to 5 by taking into consideration the total weight of the tent, like the lower case 110. The outer walls 121, the inner walls 122, and the ceiling portion 123 may be integrated with one another.

Although the ceiling portion 123 may be composed of a single layer made of the same material as the upper case 120, it may be composed of multiple layers by taking into consideration various factors such as strength reinforcement or insulation reinforcement.

When the ceiling portion 123 is composed of multiple layers, a first ceiling support layer 123a made of an insulating foam mat and a second ceiling support layer 123b made of an aluminum composite panel may be sequentially stacked from above. They may be attached to one another in an integrated form.

When a material constituting the second ceiling support layer 123b of the ceiling portion 123 is an aluminum composite panel, a composite panel in the form of a three-layer structure composed of profiles 112a serving as supports, compressed insulating foams 112b, and aluminum plates 112c may be used, as in the bottom layer 112 of FIG. 5.

Meanwhile, the lower case 110 and the upper case 120 with which the lower case 120 is covered are completely opened or kept closed securely by locking means 160 that are mounted to enable a locking or unlocking operation at appropriate positions.

As long as the locking means 160 achieves the same function, it is not limited to a specific structure, and various types of locking structures commonly used in the prior art or locking or other similar locking structures may freely be employed.

Furthermore, the lower case 110 and the upper case 120 may have various shapes. For example, they may be variously fabricated in various shapes and designs by taking into consideration various factors such as the roof plane shape of a vehicle or trailer, air resistance according to driving of a vehicle, and design feasibility.

Furthermore, awning installation parts 116 and 124 configured to appropriately connect and install awnings may be provided on the outer circumferential surfaces of the outer walls 111 and 121 of the lower case 110 and the upper case 120, respectively.

By using the awning installation parts 116 and 124, an awning may be conveniently used by selectively connecting the awning to the tent according to the type or shape of a vehicle, the size of the awning, and/or the like.

The front and rear upright skeleton walls 140 and both the side walls 150 may be configured to be hingedly connected at their both ends between the lower case 110 and the upper case 120 and to be folded inward or unfolded in order to form or eliminate the inner activity space 130 of the tent.

The front and rear upright skeleton walls 140 and both the side walls 150 may be made of a hard material such as an aluminum composite panel.

An aluminum composite panel constituting each of the front and rear upright skeleton walls 140 and both the side walls 150 may be a composite panel having a three-layer structure composed of profiles 112a serving as supports, compressed insulation foams 112b interposed between the profiles, and aluminum plates 112c provided on both sides of the profiles and the compressed insulation foams, as shown in FIG. 5 as an example.

The aluminum composite panel having a three-layer structure as described above may have excellent strength and heat insulation while being lightweight. Furthermore, the penetration of moisture from the outside to the inside may be prevented reliably. Furthermore, when a surface of an aluminum plate is made smooth, the aluminum plate exhibits a characteristic that allows water or moisture to easily flow down the surface when it rains or dew condensation occurs. Accordingly, even with the material itself, water or moisture may be removed more rapidly and easily. Moreover, even when there is water or moisture on the surface, it may be possible to easily remove or wipe it off using various tools such as a wiper, e.g., a car window brush, or a towel.

The front and rear upright skeleton walls 140 may be disposed to correspond to front and rear sides between the lower case 110 and the upper case 120, and may be connected and supported to each other in order to be folded or unfolded inside.

The front and rear upright skeletal walls 140 are separated into first and second partition walls 141 and 142. The lower and upper ends of both ends of the first and second partition walls are hinged to the outer walls 111 of the lower case 110 and the inner walls 122 of the upper case 120 so that the first and second partition walls are folded inward. Furthermore, partition boundary surfaces are also hinged in order to be folded inward.

In addition, erection means 143 for enabling the first and second partition walls in an inwardly folded state to be directly erected are mounted on both sides of each of the partition boundary surfaces of the first and second partition walls 141 and 142.

Both ends of the erection means 143 are connected and supported in order to be pivotally operated and compressed with respect to erection operation spaces 141a and 142a formed in the first and second partition walls, respectively.

In addition, the inner surfaces of the first and second partition walls 141 and 142 in which the erection operation spaces 141a and 142a are formed are covered with partition covers 141b and 142b configured to securely cover the erection means 143.

Accordingly, the front and rear upright skeleton walls 140 are configured such that the first and second partition walls 141 and 142 can be automatically vertically unfolded through the self-erection operation of the erection means 143 connected between the partition boundary surfaces.

One or more pieces of erection means 143 may be appropriately arranged and mounted by taking into consideration the size and load of the first and second partition walls 141 and 142.

In addition, the erection means 143 may have various types of structures as long as the structures can achieve the function thereof. One or more shock absorbers having various structures, such as a gas spring-type, hydraulic type, or electric type structure, may be used as the erection means 143.

Figure 10:
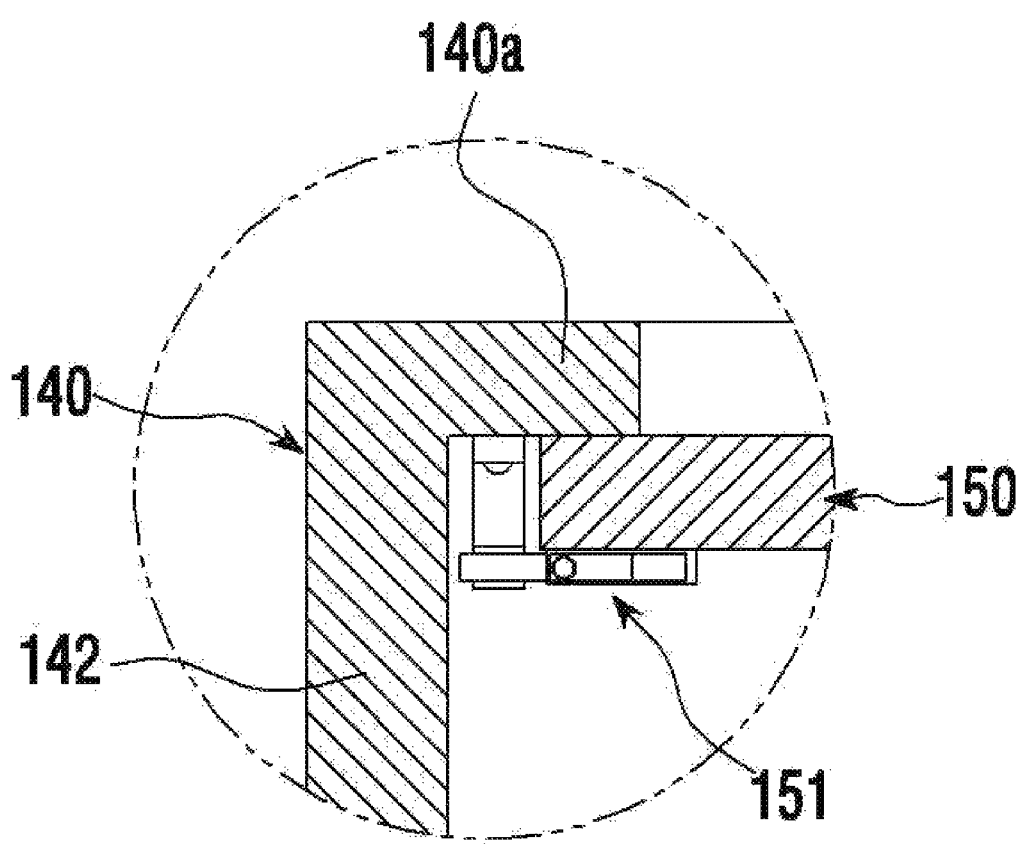
FIG. 10 is an excerpt view showing a structure in which an erection support wall is formed for front and rear upright skeletal walls according to the present invention.

In addition, as shown in FIG. 10, one or more torsion springs having appropriate elastic strength may be used as the erection means 143.

As described above, both ends of the front and rear upright skeleton walls 140 are connected and supported by hinges between the lower case 110 and the upper case 120. Furthermore, both ends of the erecting means 143 are rotatably connected and supported with respect to the erection operation spaces 141a and 142a formed by the partition boundary surfaces of the first and second partition walls 141 and 142. Accordingly, by opening the upper case 120 with respect to the lower case 110, the front and rear upright skeleton walls 140 are automatically erected at the same time and are vertically unfolded through the self-erection operation of the erection means 143 that have been forcibly compressed.

Meanwhile, in the front and rear upright skeleton walls 140, more preferably, a window 144 configured to function as an internal ventilation or see-through window may be further installed to be selectively opened and closed in the second partition wall 142 located at an upper location when the tent is put up.

The window 144, which is hinged to the second partition wall 142 to be selectively opened and closed in one direction, may be further provided with an auxiliary opening/closing means 145 to induce more stable and smooth opening and closing operations.

A shock absorber having various structures such as a gas spring-type, hydraulic pressure-type or electric type structure may be used as the auxiliary opening/closing means 145.

Furthermore, it is obvious that the window 144 can be waterproofed using an elastic material such as rubber packing along the circumference including the portion connected by the hinge.

In addition, it is obvious that the window 144 can be waterproofed using an elastic material such as rubber packing along the edges including the portions connected by the hinges.

Furthermore, a folding molding 144a made of an elastic rubber material may be further adhered to the upper end portion of the window 144 connected to the first partition wall 142 by a hinge in order to prevent rainwater or moisture from penetrating into the inner activity space 130 through the open gap when the window 144 is opened.

The side walls 150 configured to form the inner activity space 130 of the tent are arranged and configured to face each other on both sides of the front and rear upright skeleton walls 140, and may be formed of a single wall.

The side walls 150 are configured to be sequentially folded or erected inside the lower case 110. To this end, the lower ends of the side walls 150 may be hinged to the corresponding inner walls 112 of the lower case 110.

Therefore, the side walls 150 are enabled to be sequentially folded or erected inside the lower case 110 around the hinges at the lower ends by artificially pulling or pushing the upper ends inward.

Both ends of both the side walls 150 erected and supported with respect to the first and second partition walls 141 and 142 of the front and rear upright skeleton walls 140 may be stably supported on the inner surfaces of erection support walls 140a, which are further extended and bent at right angles to the corners of both ends of the first and second partition walls 141 and 142, as illustrated in FIG. 10.

Figure 4:
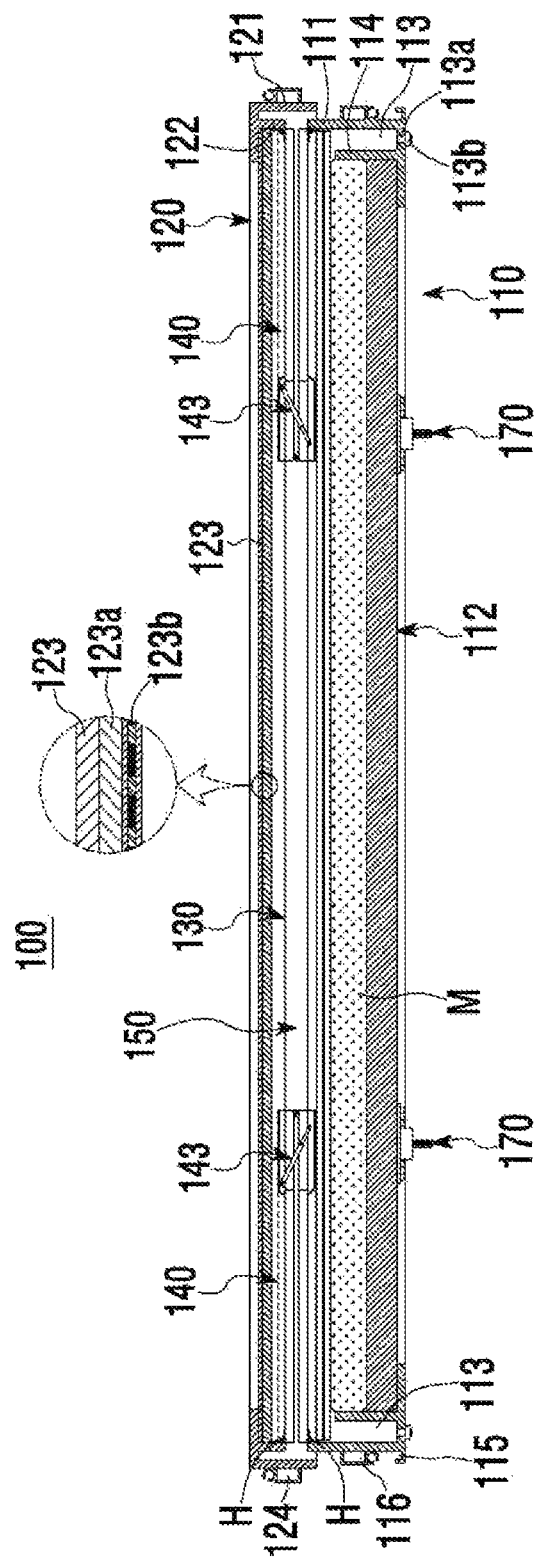
FIG. 4 is a longitudinal sectional view of the folded state of the hard rooftop tent according to the present invention.

The erection support walls 140a are supported on the outsides of the outer walls 111 of the lower case and the inner walls 122 of the upper case 120, as shown in FIG. 4, when the front and rear upright skeleton walls 140 are folded.

In addition, erection maintenance means 151 configured to stably maintain a vertically erected state to correspond to the front and rear upright skeleton walls 140 may be provided inside the upper ends of the side walls 150.

The erection maintenance means 151 may not need to be limited to a specific structure as long as it can prevent the upper ends of the side walls 150 from being freely tilted or falling inward from the front and rear upright skeleton walls 140.

Figure 7:
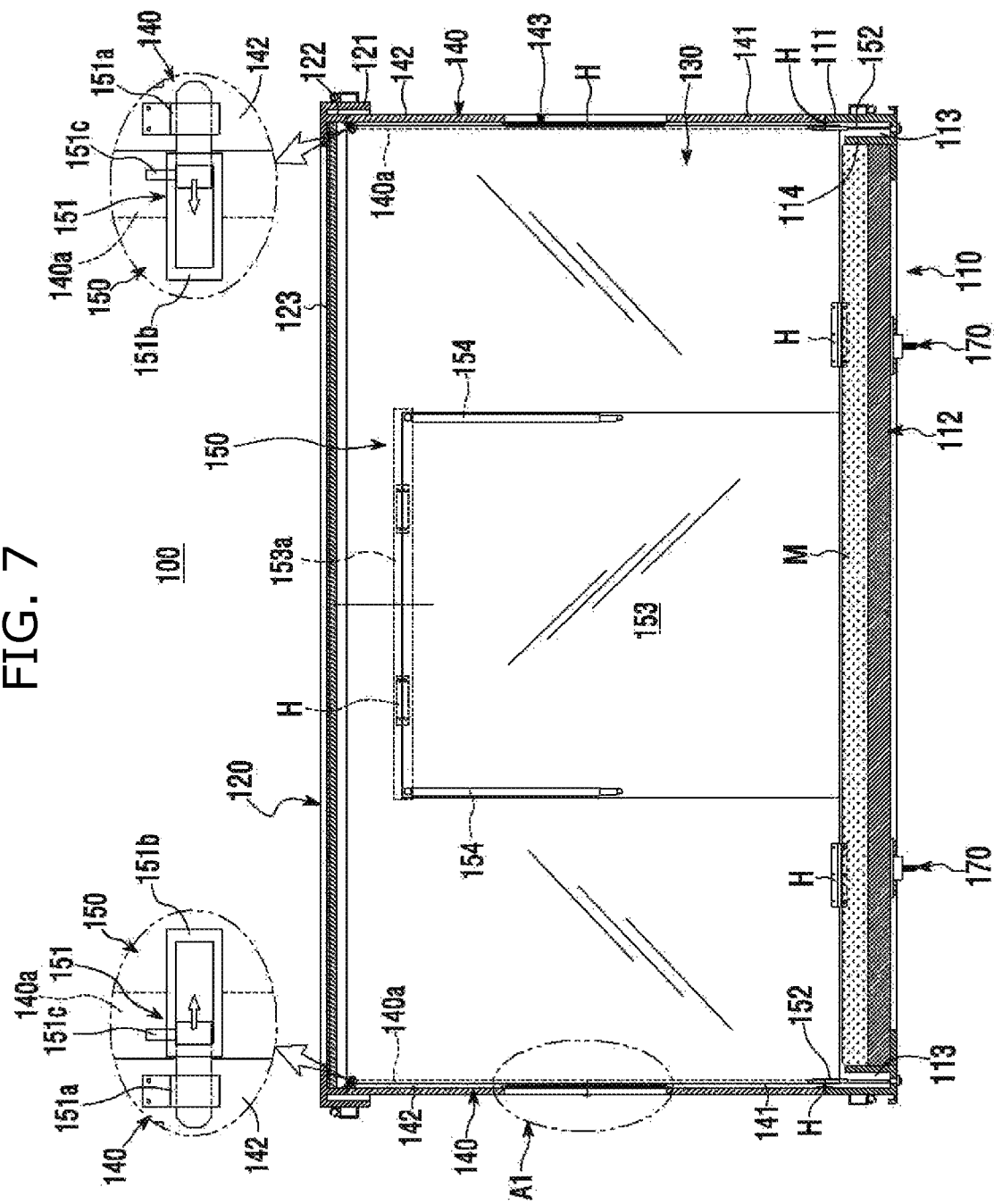
FIG. 7 is a sectional view of a state in which the hard rooftop tent according to the present invention is unfolded based on FIG. 4.
Figure 8:
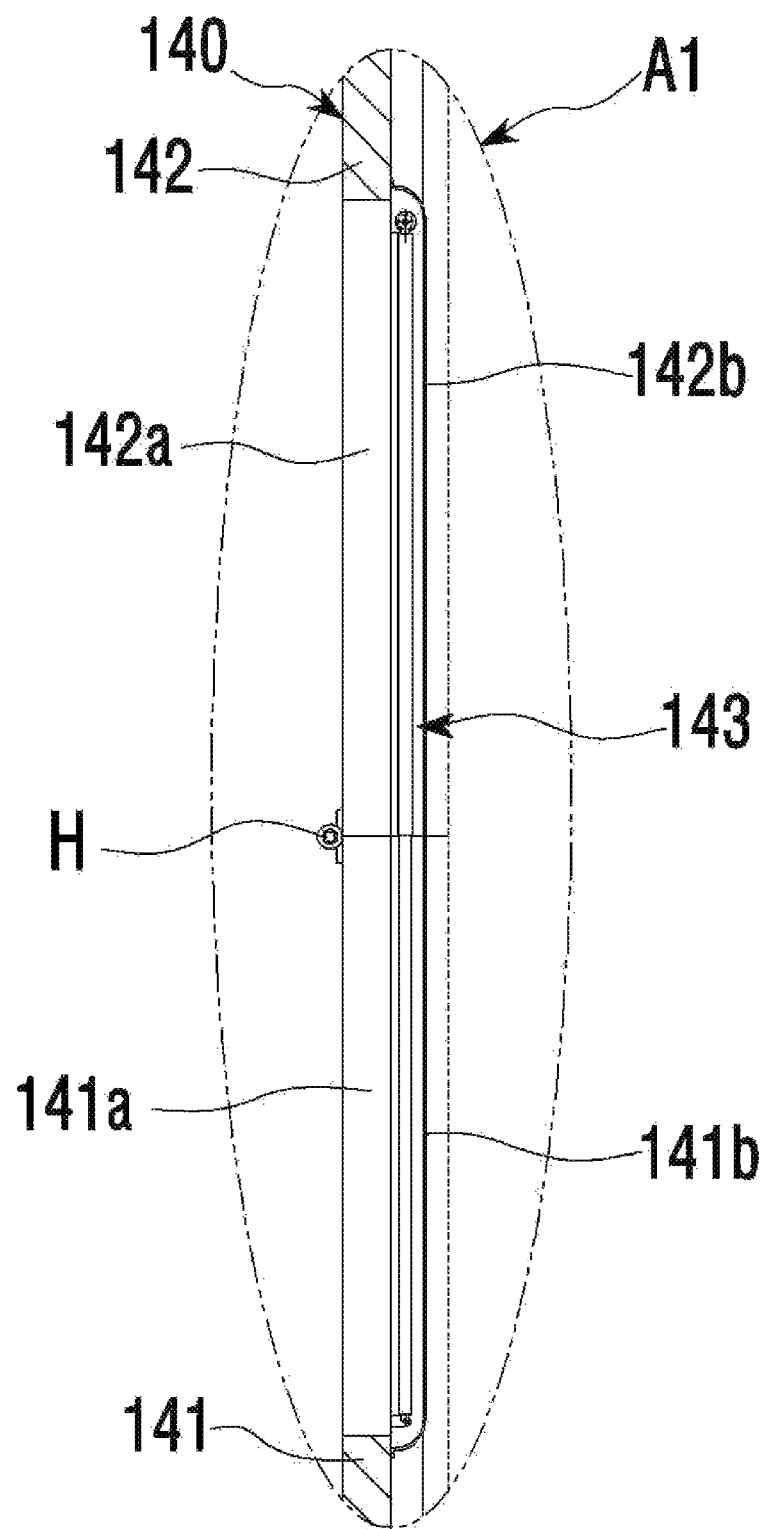
FIG. 8 is an enlarged excerpt view of portion A1 of FIG. 7.
Figure 9:
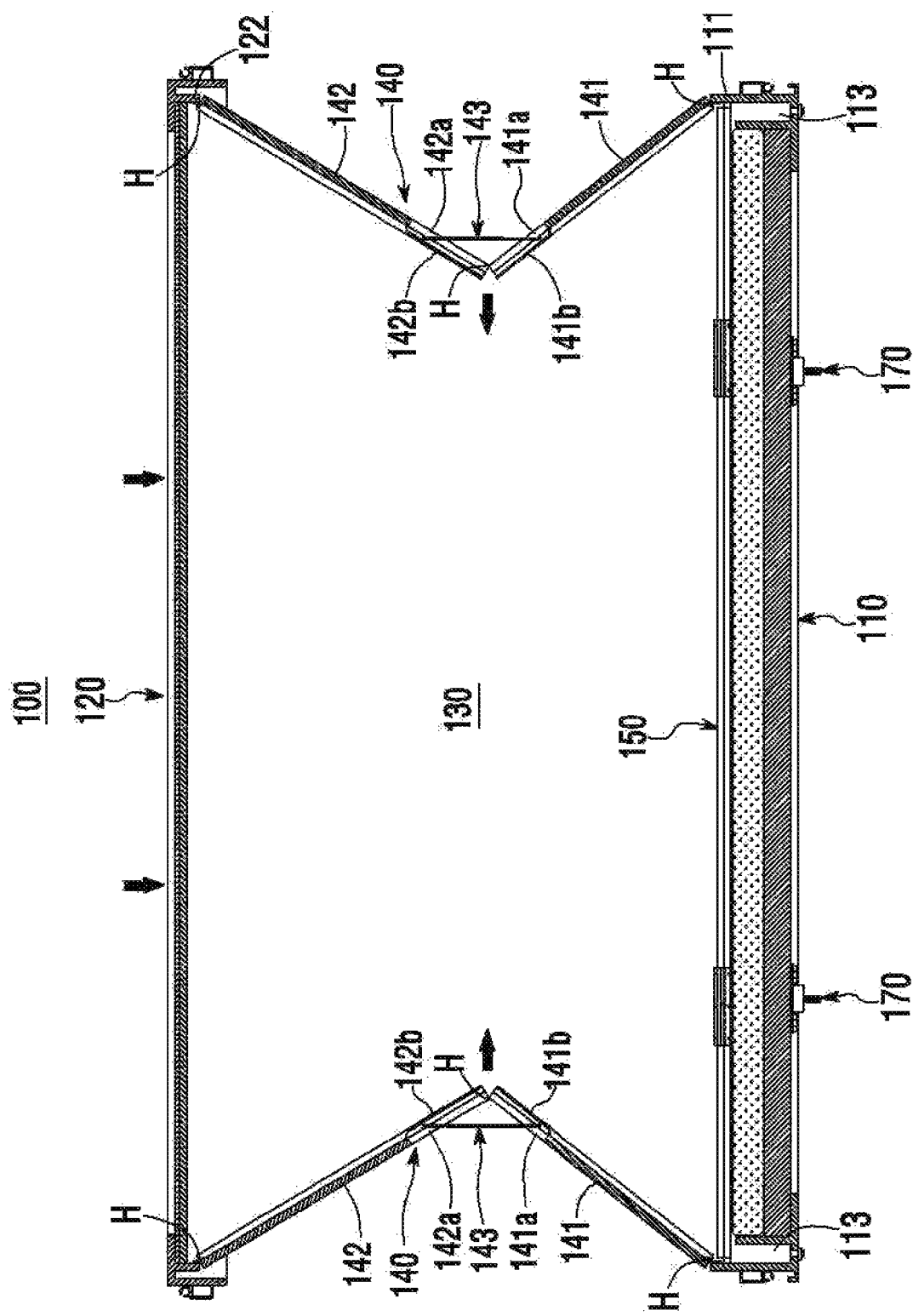
FIG. 9 is a sectional view of a state in which the hard rooftop tent according to the present invention is partially folded based on FIG. 4.
Figure 11:
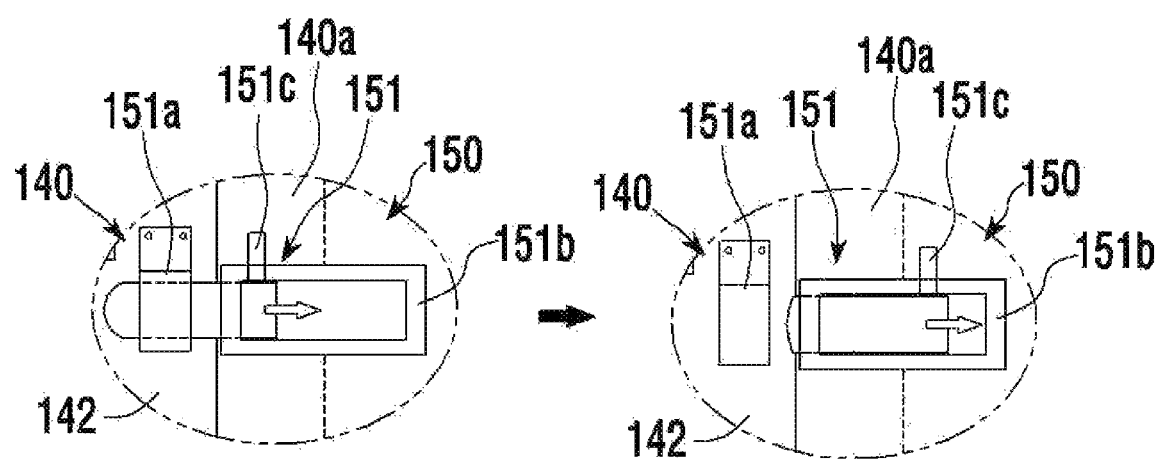
FIG. 11 is an excerpt view showing the locking and releasing states of an erection maintenance means according to the present invention.
Figure 12:
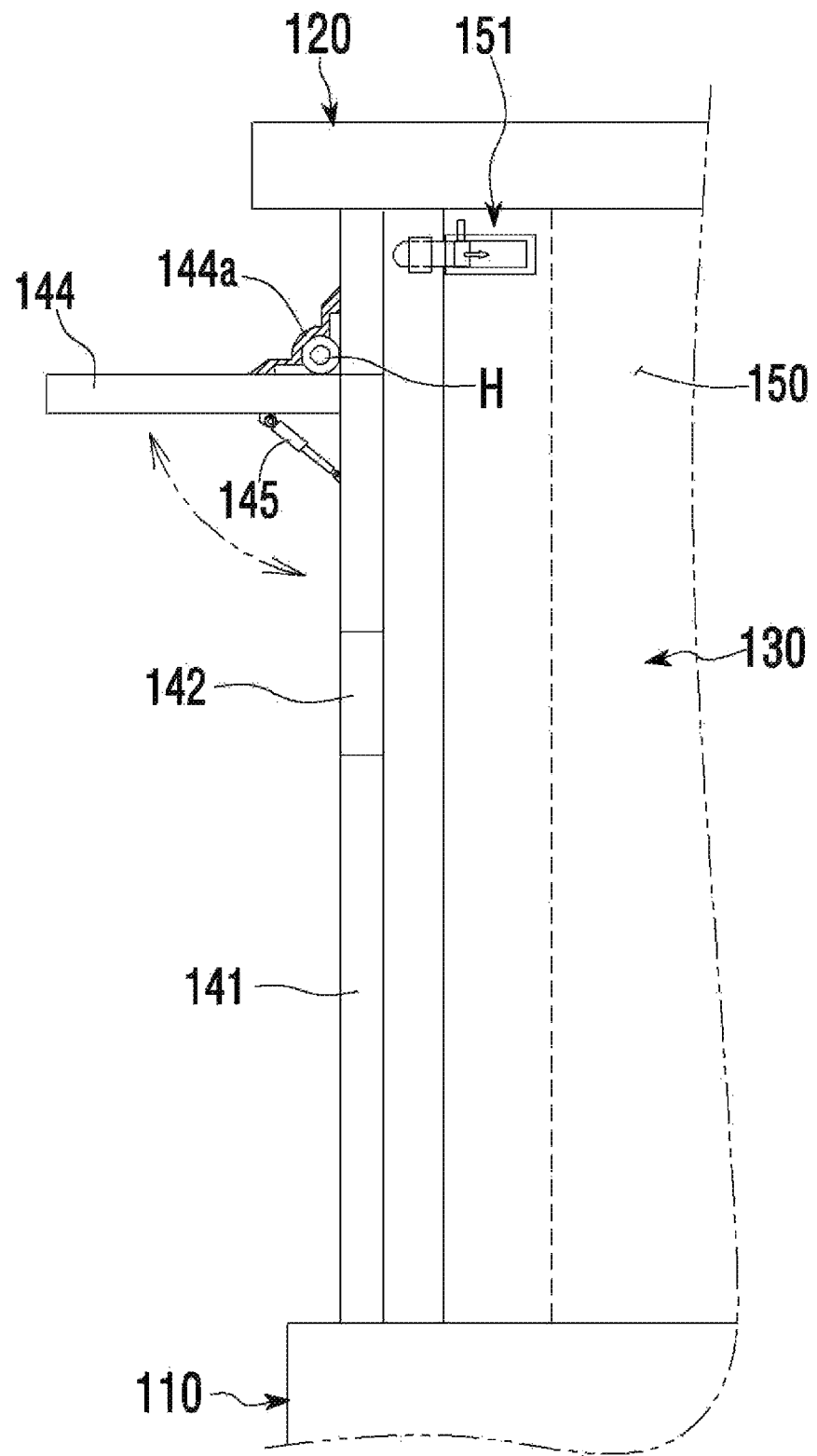
FIG. 12 is an excerpt side view showing the open state of a window formed in front and rear upright skeletal walls according to the present invention.
Figure 13:
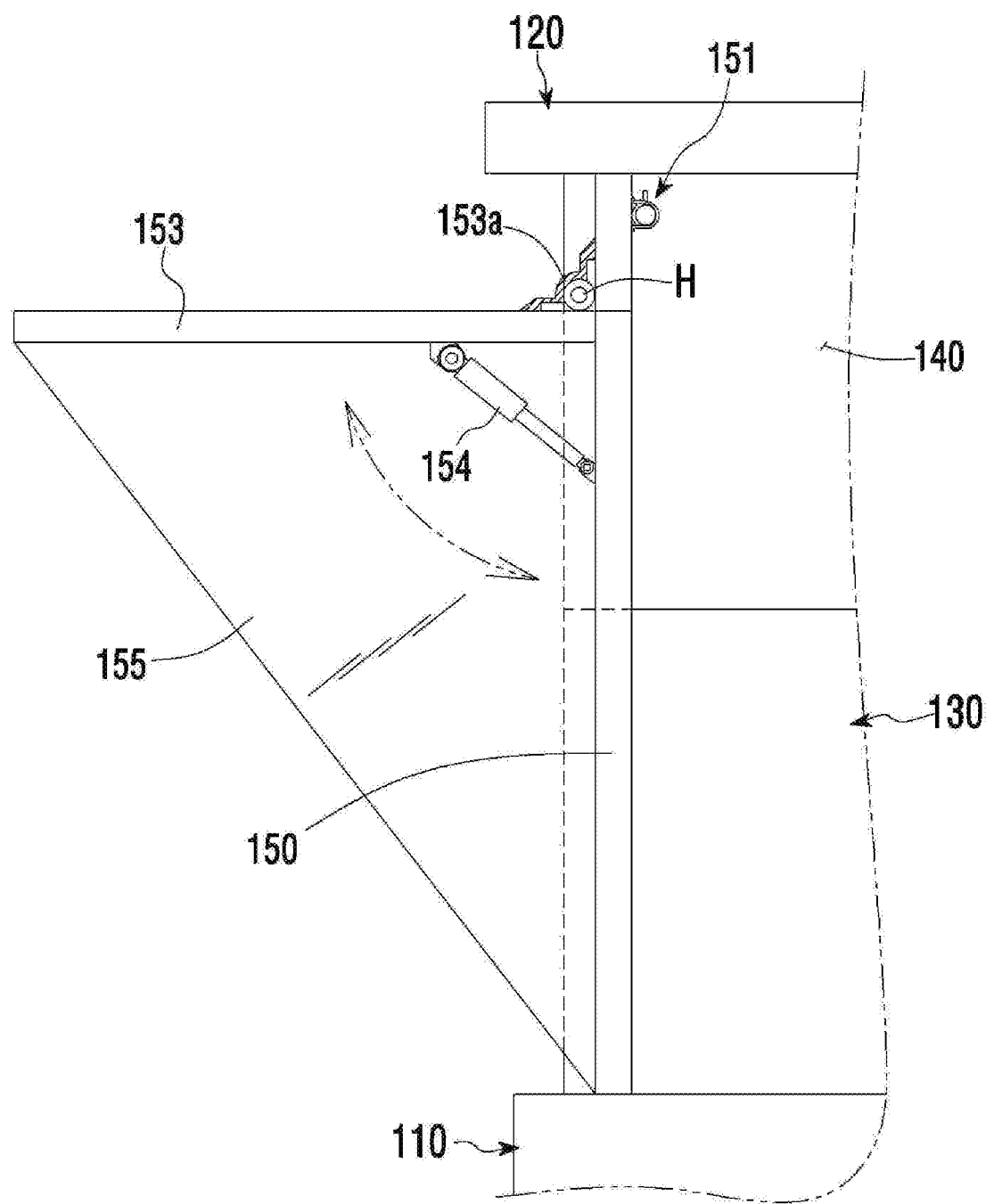
FIG. 13 is an excerpt side view showing the open state of an entrance formed in both side walls according to the present invention.
Figure 14:
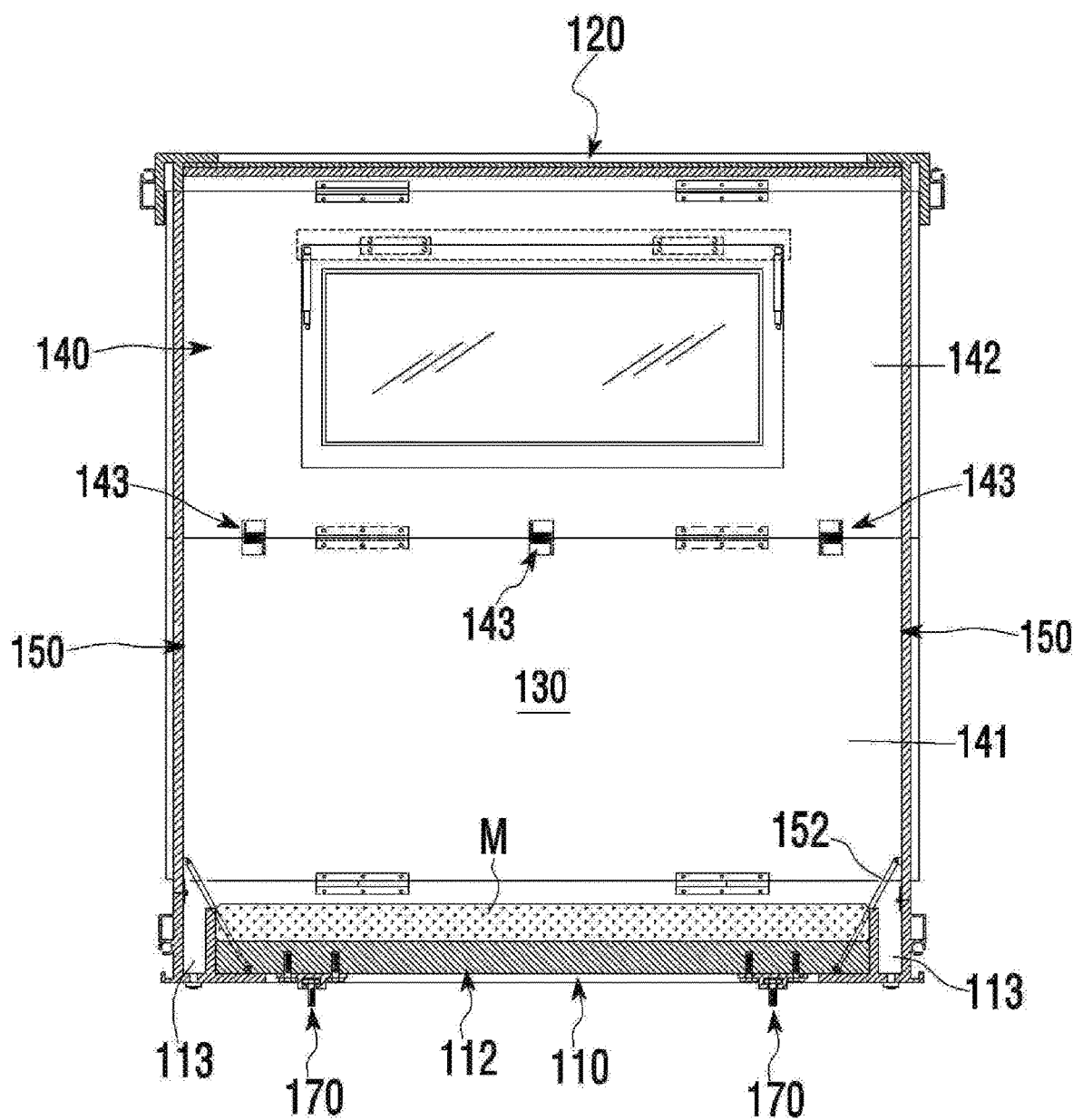
FIG. 14 is an excerpt view showing the structure of another erection means of a hard rooftop tent according to the present invention.

For example, as illustrated in FIGS. 7 and 11, the erection maintenance means 151 may include a catch ring 151a fixed to the erection support wall 140a extending at right angles from the front and rear upright skeleton walls 140, more specifically, the second partition wall 142, a slide holder 151b fixed to the inner surface of a corresponding one of the side walls 150, and a movement control pin 151c mounted inside the slide holder to be movable left and right and engaged and released with and from the catch ring.

Therefore, the side wall 150 whose lower end is hinged to the inner wall 112 of the lower case 110 through the configuration of the erection maintenance means 151 is fixedly supported to be erected in a forcibly engaged state with respect to the front and rear upright skeleton walls 140 in a state where the upper end of the side wall 150 is stably supported on the erection support wall 140a. Accordingly, a stable vertically unfolded state may always be maintained at all times, and at the same time, arbitrary folding may be prevented.

In addition, both the side walls 150 whose lower ends are hinged to the inner walls 112 of the lower case in order to be folded inside the lower case 110 are further provided with auxiliary erection means 152 installed in connection with the bottom of the trench 113 of the lower case inside each lower end. Accordingly, the operation of folding or erecting may be performed more smoothly and stably.

In this case, a shock absorber having various structures such as a gas spring-type, hydraulic pressure-type or electric type structure may be used as the auxiliary erection means 152.

Through the configuration of the auxiliary erection means 152, both the side walls 150 can be folded or erected more stably and smoothly in a semi-automatic manner in addition to manual erection.

An entrance 153 is provided in the side wall 150. The entrance functions as a kind of door that allows a user to enter and exit the inner activity space 130 through a ladder during camping, may be installed to be opened and closed in one direction, and may be installed on any one of the side walls or each of the side walls.

It is preferable that the upper part of the entrance 153 is connected and supported by a hinge in order to be selectively opened and closed in a state of being lifted upward. In this case, a smoother and more stable opening and closing operation may be induced using a separate auxiliary opening/closing means 154.

The auxiliary opening/closing means 154 may be formed of a shock absorber having various structures such as a gas spring-type, hydraulic pressure-type or electric type structure.

In addition, it is obvious that the entrance 153 can be waterproofed using an elastic material such as rubber packing along the circumference including the portion connected by the hinge.

Furthermore, a foldable molding 153a made of an elastic rubber material may be further adhered to the upper part connected to the side wall 150 by a hinge in order to prevent rainwater or moisture from permeating into the inner activity space 130 through the open gap when the entrance 153 is opened.

In addition, awnings or shields 155 may be further installed to the left and right sides of the entrance 153 to appropriately block wind, rain, and/or the like. In this case, various materials may be used for the shield, but a waterproof cloth material may be used therefor.

In the description of the present invention, the hinges are denoted by "H" in a uniform manner. However, the hinges are not limited to a specific structure, and it is obvious that various types of hinge structures may be applied.

Figure 15:
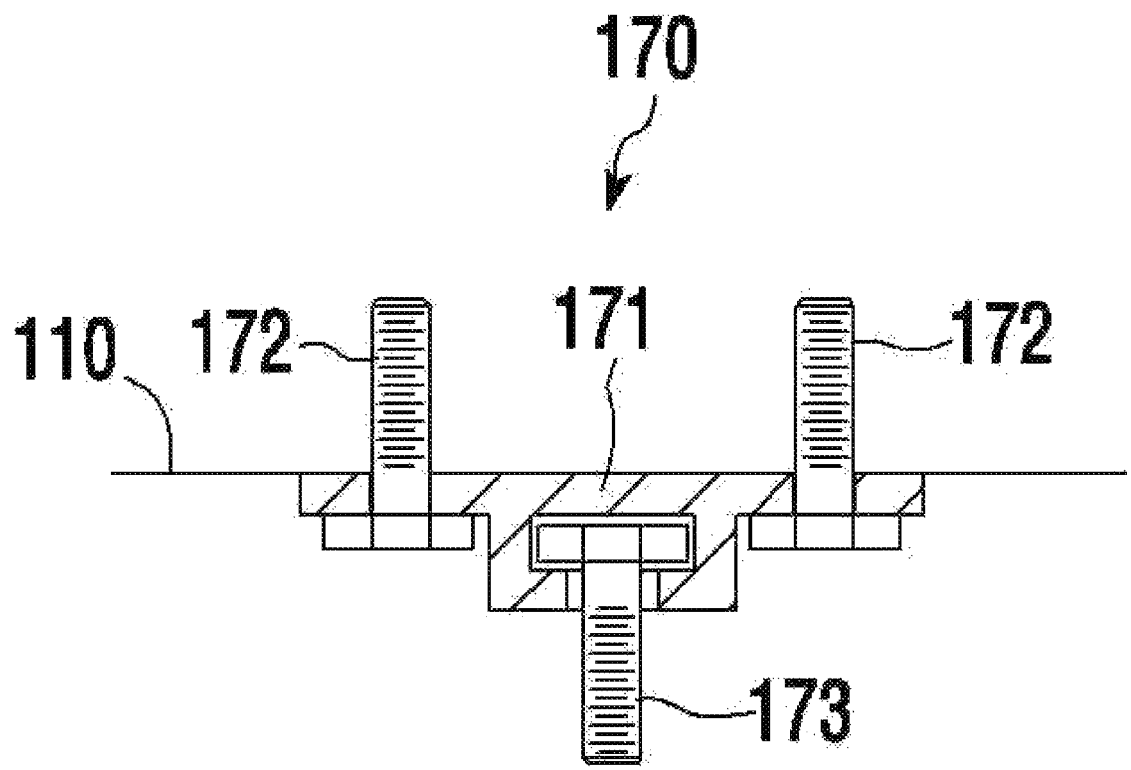
FIG. 15 is an excerpt sectional view of a roof fixation part according to the present invention.

Meanwhile, as illustrated in FIG. 15, a roof fixation part 170 may be provided beneath the lower case 110. A variety of structures may be appropriately employed for the roof fixation part described above.

Preferably, the roof fixation part 170 may include a support plate 171, a first fixation element 172 configured to fasten and fix the support plate to the lower case 110, and a second fixation element 173 configured to fix the support plate to other elements including a roof rack.

The support plate 171 of the roof fixation part 170 is formed to be wider than the existing structure, so that the support width for the lower case can be configured wider. As a result, this makes it possible to distribute the support load, so that more stable supporting and more firm fastening and fixation to the roof can be made possible.

When the hard rooftop tent 100 configured as described above moves while being mounted on the roof of a vehicle or trailer, the lower case 110 is covered with the upper case 120 in a state securely closed by the locking of the locking means 160. Furthermore, the front and rear upright skeleton walls 140 and side walls 150 configured to form the inner activity space 130 of the tent are securely stored in a folded state inside the lower case 110 and the upper case 120.

Therefore, the front and rear upright skeleton walls 140 and both side walls 150 are securely accommodated inside the lower and upper cases 110 and 120 during storage or movement. Accordingly, they are not affected by climatic conditions such as rain, wind or snow or an external environment. Furthermore, the lower case 110 and the upper case 120 are made of hard materials. Accordingly, even in rainy weather, rain does not permeate into the interior, and there is no influence of air resistance caused by the movement of the vehicle or trailer.

In this state, when a user arrives at a camping site and attempts to put up the hard rooftop tent 100 of the present invention, the formation of the inner activity space 130 necessary for camping may be provided rapidly by releasing the locking force of the locking means 160 that binds the lower case and the upper case.

Figure 2:
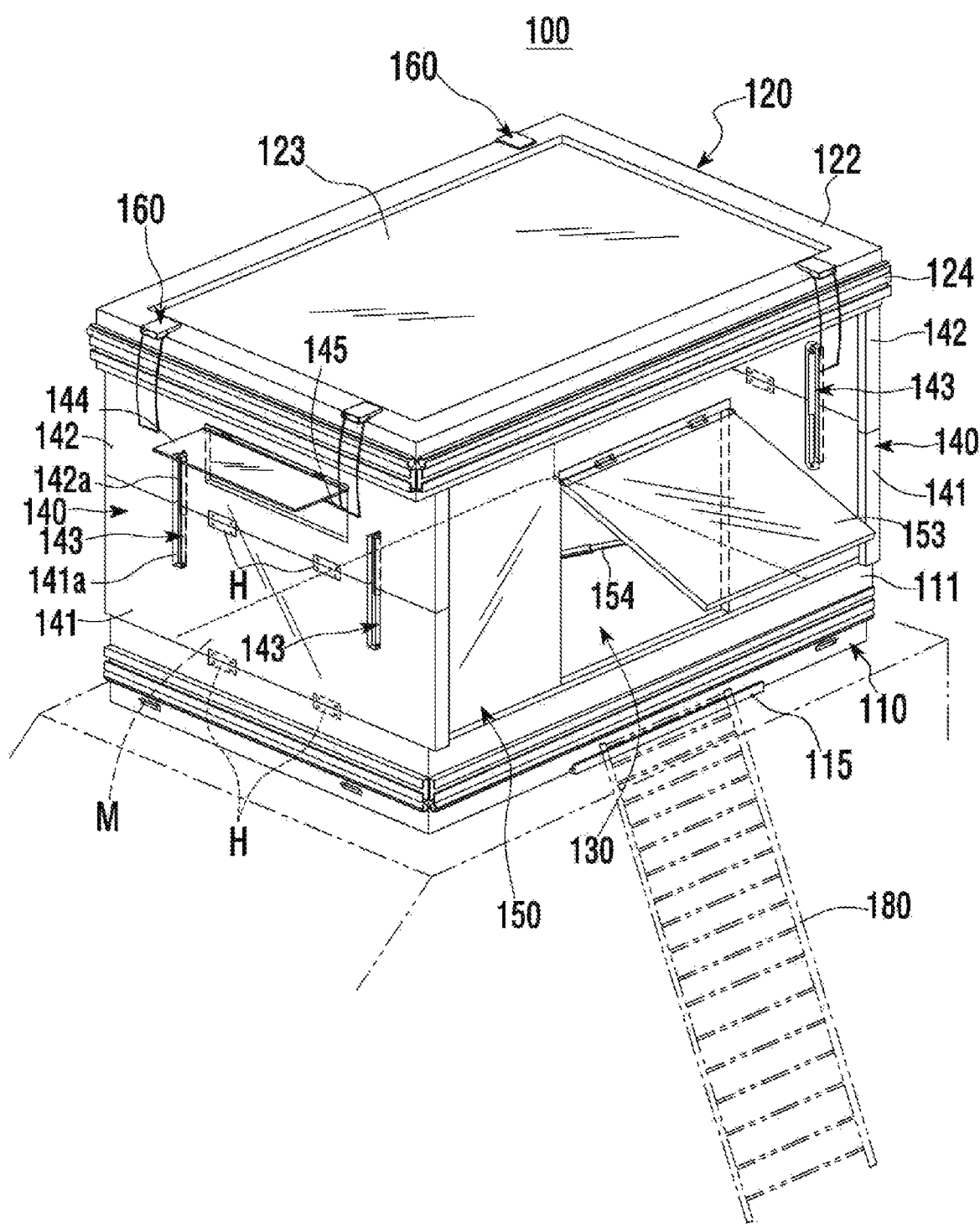
FIG. 2 is a perspective view of the unfolded state of the hard rooftop tent according to the present invention.
Figure 3:
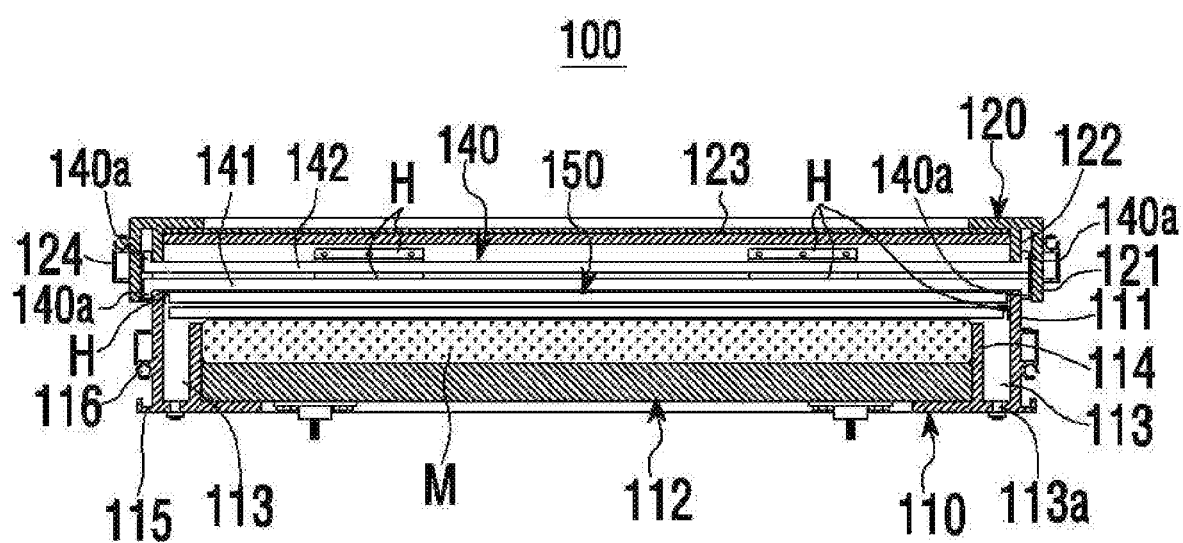
FIG. 3 is a transverse sectional view of the folded state of the hard rooftop tent according to the present invention.

That is, as illustrated in FIG. 2, the locking force of the upper case applied to the lower case is released by unlocking the locking means 160 binding the lower case 110 and the upper case 120 to each other. At the same time, the front and rear upright skeleton walls 140, which are accommodated in a folded state inside the lower case 110 and the upper case 120, are automatically erected while being unfolded based on the lower case 110 by the extension force of the erection means 143 whose both ends were connected and supported in a compressed state in the folding operation spaces 141a and 142a formed in the first and second partition walls 141 and 142 of the front and rear upright skeleton walls 140. At the same time, the upper case 120 hingedly connected to the first and second partition walls is also erected upward. The upper case 120 erected upward by the first and second partition walls serves as the roof of the tent.

The first and second partition walls 141 and 142 of the front and rear upright skeleton walls 140, which are automatically erected by the erection means 143, are erected in a vertical state. In this case, the first and second partition walls erected in a vertical state maintain a stable erected state unless the erection means is artificially compressed.

In addition, after the front and rear upright skeletal walls 140 have been automatically erected, the side walls 150 are sequentially pulled and erected. In this case, the side walls 150 may be erected more smoothly and stably by the auxiliary erection means 152. In particular, the auxiliary erection means is not freely compressed, and thus an erected state can be maintained.

Meanwhile, both the side walls 150 erected vertically with respect to the erection support walls 140a of the front and rear upright skeleton walls 140 are locked and fixed to the front and rear upright skeleton walls using the erection maintenance means 151. Accordingly, a more stable erection state may be maintained. During internal movement, the side walls may be reliably prevented from accidentally falling down or being inclined.

As described above, the inner activity space 130 of the tent is formed through the automatic and passive erection operation of the front and rear upright skeleton walls 140 and the side walls 140.

The front and rear upright skeletal walls 140 and both the side walls 150, which are erected to form the inner activity space 130, are erected in close contact with the inner circumferential surfaces of the outer walls 111 of the lower case 110 and the inner circumferential surfaces of the inner walls 122 of the upper case 120. Accordingly, there is no gap caused by the erection.

In addition, the entrance 153 formed by the side wall 150 is opened, the ladder 180 is placed at an angle between the ground and the ladder support 115 formed on the lower case 110, and then a user may enter the inner activity space 130 and perform activities such as taking a break.

Furthermore, when necessary, the window 144 formed by the front and rear upright skeleton walls 140 may be opened and appropriately utilized.

Meanwhile, according to the present invention, when moisture flows down the inner walls of the front and rear upright skeleton walls 140 or side walls 150 due to dew condensation during camping, water is collected in the trench 113 formed in the lower case 110 and drained to the outside. Accordingly, the mattress M or the like laid on the bottom layer 112 may be prevented from being wet or penetrated by moisture. In addition, even in rainy weather, rainwater is prevented from permeating into the interior because the front and rear upright skeletal walls 140 and the side walls 150 are made of hard materials.

In addition, in the case of the present invention, the front and rear upright skeletal walls 140 and both the side walls 150 are made of hard materials that prevent water or moisture penetration. Accordingly, moisture or moisture may simply be removed from the inner or outer walls by using a separate tool, e.g., a removal tool such as a wiper, by wiping it with a rag, or the like. When the tent is used or taken down, moisture or moisture may be removed rapidly. In particular, the fact that it is easy to remove the moisture or moisture as described above has the advantage of minimizing the investment in time, place, and effort even when additional removal of moisture or moisture that has not been removed after the tent has been taken down is required.

Therefore, even in the event of dew condensation or rain, the mattress M laid on the bottom layer 112 may be securely used without getting wet or damaged or broken due to penetration of moisture. Furthermore, even when the tent is taken down, moisture or moisture may be rapidly and easily removed from the inner and outer surfaces of the front and rear upright skeleton walls 140 or side walls 150. Accordingly, the operation of taking down the tent may be performed conveniently and rapidly. In particular, the front and rear upright skeleton walls 140 or the side walls 150 may be stored inside the lower and upper cases 110 and 120 in a state in which moisture has been removed, and thus hygienic use is possible.

Meanwhile, when camping is over and the tent is folded, moisture or moisture is removed from the inner and outer circumferential surfaces of the front and rear walls and the side walls first. Then, when the erection maintenance means 151 installed on the side walls 150 is locked to the front and rear upright skeleton walls 140, it is unlocked first, and then The side walls 150 are first sequentially pushed into the lower case 110 and folded. In this case, the side walls 150 are smoothly and stably folded by the erection support means 152.

In the above-described state, the first and second partition walls 141 and 142 of the front and rear upright skeleton walls 140 are bent inward by pushing the folding boundary surfaces of the first and second partition walls 141 and 142 constituting the front and rear upright skeleton walls 140 inward so that they are slightly bent or by simply pressing the upper case 120 in a vertically erected state. At the same time, the erection means 143 are compressed to each other through the erection operation spaces 141a and 142a, and are folded inside the lower case 110, that is, over the side walls 150.

Then, after the operation of folding the side walls 150 and the front and rear upright skeleton walls 140 into the lower case 110 has been completed as described above, the upper case 120 is locked to the lower case 110 by using the locking means 160, so that the operation of taking down the tent can be completed simply. Thereafter, finally, the ladder 180 may be removed.

Therefore, according to the present invention, the front and rear upright skeleton walls 140 foldably connected and installed between the lower case 110 and the upper case 120 may automatically be erected vertically or folded inside at the same time that the upper case 120 is opened by the self-extending and compressing operation of the erection means 143 installed to rotate the first and second partition walls 141 and 142 with respect to the erection operation spaces 141a and 142a. Furthermore, the formation and dismantlement of the inner activity space 130 of the tent may be made rapidly and easily through the manual or erection support means 152-based semi-automatic operation of erecting and folding the side walls 150. Moreover, through the configuration of the trench 113 installed inside the lower case 110, in particular, water or moisture flowing along the inner wall due to dew condensation may be collected and removed. As a result, there is provided a remarkable advantage in which various other items, including the mattress M used in a state of being laid on the floor layer 112, may be used stably without the problem of getting wet or being damaged.

Meanwhile, according to the present invention, when the electric shock absorbers are used as the auxiliary erection means 152 and the opening/closing means 154 including the erection means 143, they may be connected to the cigar jack or battery of a vehicle and then operated electrically.

Although the present invention has been described with reference to specific details such as specific components and limited embodiments and drawings, these are provided only to help a more general understanding of the present invention, and the present invention is not limited to the above embodiments. Those skilled in the art may make various modifications and changes from these descriptions.

Therefore, the spirit of the present invention is not limited to the described embodiments, and not only the claims but also all modifications equivalent thereto will fall within the scope of the technical spirit of the present invention.

The invention claimed is:

1. A hard rooftop tent, comprising:
   a lower case made of a hard material, and configured to be detachably fixed and supported on a roof of a vehicle or trailer;
   an upper case made of a hard material, and configured to be selectively locked and unlocked to and from the lower case by a locking means; and
   front and rear upright skeleton walls and both side walls interposed between the lower and upper cases, connected and supported to and on the lower and upper cases as one unit in order to form and eliminate an inner activity space through an operation of folding into the inside thereof or unfolding, and made of a hard material;
   wherein the lower case includes outer walls, inner walls, and a bottom layer;
   wherein the upper case includes outer walls, inner walls, and a ceiling;
   wherein the front and rear upright skeletal walls include first and second partition walls hinged to the outer walls of the lower case and the inner walls of the upper case so that both ends are folded to an inside of the lower case and configured such that partition boundary surfaces are also connected and supported by hinges, erection operation spaces formed between the partition boundary surfaces of the first and second partition walls to allow the first and second partition walls to be erected on their own, and an erecting means connected to the first and second partition walls in order to be rotated and folded through the erection operation space;
   wherein the side walls include an entrance, are disposed on both sides of the front and rear upright skeletal walls, and are sequentially folded with lower ends hinged to the outer walls of the lower case; and
   wherein a trench configured to collect and remove water or moisture flowing along inner walls of the tent is formed between the outer and inner walls of the lower case.

2. The hard rooftop tent of claim 1, wherein a drainage hole is further formed in the trench.

3. The hard rooftop tent of claim 1, wherein the lower case, the upper case, the bottom layer, the front and rear upright skeletal walls, the side walls, and the ceiling are each made of any one of aluminum, and an aluminum composite panel having a three-layer structure including profiles, compressed insulation foams, and aluminum plates.

4. The hard rooftop tent of claim 1, wherein the ceiling of the upper case is formed by sequentially stacking a first ceiling support layer made of an insulating foam mat and a second ceiling support layer made of an aluminum composite panel.

5. The hard rooftop tent of claim 1, wherein erection support walls configured to stably erect and support both the side walls are further extended from the first and second partition walls of the front and rear upright skeleton walls.

6. The hard rooftop tent of claim 1, wherein the side walls are configured such that the front and rear upright skeleton walls are first erected by the erection means and then sequentially erected when the inner activity space is formed, and are sequentially folded first when the inner activity space is eliminated.

7. The hard rooftop tent of claim 1, wherein the side walls are further provided with erection maintenance means for stably maintaining an erected state with respect to the front and rear upright skeletal walls, and the erection maintenance means each includes a catch ring fixed to the erection support wall extending at right angles from the second partition wall of the front and rear upright skeleton walls, a slide holder fixed to an inner surface of a corresponding one of the side walls, and a movement control pin mounted inside the slide holder to be movable left and right and engaged and released with and from the catch ring.

8. The hard rooftop tent of claim 1, wherein the side walls are configured such that a folding operation is performed smoothly and stably by further installing an auxiliary erection means between the side walls and the lower case.

9. The hard rooftop tent of claim 1, wherein a shield is further provided on either side or both sides of the entrance that is open in the side walls.

10. The hard rooftop tent of claim 1, wherein the erection means are shock absorbers.

11. The hard rooftop tent of claim 10, wherein each of the shock absorbers is any one of gas, hydraulic, and electric shock absorbers.

12. The hard rooftop tent of claim 1, wherein the outer walls of the lower case and the inner walls of the upper case are arranged on same vertical lines so that the front and rear upright skeleton walls and the side walls can be folded between them, and the outer walls of the upper case are formed to extend further below lower ends of the inner walls of the upper case so that when the upper case is closed with respect to the lower case, the upper case is closed in a such a manner that portions of the outer walls of the lower case are surrounded by the upper case.

13. The hard rooftop tent of claim 1, wherein partition covers configured to cover the erection means further cover and are coupled to inner surfaces of the first and second partition walls in which the erection operation spaces are formed.

14. The hard rooftop tent of claim 1, wherein a roof fixation part is provided beneath the lower case.

15. The hard rooftop tent of claim 14, wherein the roof fixation part includes a support plate, a first fixation element configured to fasten and fix the support plate to the lower case, and a second fixation element configured to fix the support plate to a roof rack.

* * * * *